United States Patent
Farivar et al.

(10) Patent No.: US 10,769,896 B1
(45) Date of Patent: Sep. 8, 2020

(54) COUNTER-FRAUD MEASURES FOR AN ATM DEVICE

(71) Applicant: Capital One Services, LLC, McLean, VA (US)

(72) Inventors: Reza Farivar, Champaign, IL (US); Kenneth Taylor, Champaign, IL (US); Austin Walters, Savoy, IL (US); Joseph Ford, III, Manakin Sabot, VA (US); Rittika Adhikari, Westford, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/400,791

(22) Filed: May 1, 2019

(51) Int. Cl.
| G07F 19/00 | (2006.01) |
| G06K 9/62 | (2006.01) |
| G08B 21/18 | (2006.01) |
| G06K 9/46 | (2006.01) |
| G06K 9/00 | (2006.01) |

(52) U.S. Cl.
CPC ....... G07F 19/207 (2013.01); G06K 9/00355 (2013.01); G06K 9/4604 (2013.01); G06K 9/6262 (2013.01); G08B 21/182 (2013.01)

(58) Field of Classification Search
CPC .. G07F 19/207; G06K 9/4604; G06K 9/6262; G06K 9/00355; G08B 21/182
See application file for complete search history.

(56) References Cited

U.S. PATENT DOCUMENTS

| 9,147,324 | B2* | 9/2015 | Lin | G07F 19/20 |
| 10,088,908 | B1* | 10/2018 | Poupyrev | G06F 1/163 |
| 2002/0073032 | A1* | 6/2002 | Holmes | G06Q 20/1085 |
| | | | | 705/43 |
| 2004/0129773 | A1* | 7/2004 | Lute, Jr. | G07F 19/20 |
| | | | | 235/379 |
| 2006/0169764 | A1* | 8/2006 | Ross | G07F 19/207 |
| | | | | 235/375 |
| 2007/0138256 | A1* | 6/2007 | Coventry | G07F 19/20 |
| | | | | 235/379 |

(Continued)

OTHER PUBLICATIONS

Co-pending U.S. Appl. No. 16/250,719, entitled "Generating Synthetic Models or Virtual Objects for Training a Deep Learning Network", by Farivar, Reza et al., filed Jan. 17, 2019, 44 pages.

*Primary Examiner* — Bobbak Safaipour
(74) *Attorney, Agent, or Firm* — Harrity & Harrity, LLP

(57) ABSTRACT

An ATM device may receive a request to process an ATM transaction; dispense, via an instrument dispenser, a plurality of instruments based on the request; perform image segmentation of one or more images of an area surrounding the instrument dispenser, wherein the image segmentation is performed using a deep learning network trained using synthetic models of hands; detect, based on performing the image segmentation, that a user's hand approaches the instrument dispenser after dispensing the plurality of instruments; determine, after dispensing the plurality of instruments and after detecting that the user's hand approaches the instrument dispenser, that a portion of the plurality of instruments is present at the instrument dispenser; and perform one or more actions based on determining that the portion of the plurality of instruments is present at the instrument dispenser.

20 Claims, 8 Drawing Sheets

(56) References Cited

U.S. PATENT DOCUMENTS

| | | | |
|---|---|---|---|
| 2009/0057395 A1* | 3/2009 | He | G06K 9/6278 235/379 |
| 2009/0201372 A1* | 8/2009 | O'Doherty | H04N 7/188 348/150 |
| 2010/0214413 A1* | 8/2010 | Lin | G07F 19/20 348/150 |
| 2012/0117514 A1* | 5/2012 | Kim | G06F 3/011 715/849 |
| 2013/0062410 A1* | 3/2013 | Mitchell | G06K 13/0868 235/449 |
| 2014/0232863 A1* | 8/2014 | Paliga | H04N 21/278 348/143 |
| 2014/0337212 A1* | 11/2014 | Crist | G07F 19/207 705/43 |
| 2015/0154449 A1* | 6/2015 | Ito | G06K 9/00375 382/103 |
| 2016/0328604 A1* | 11/2016 | Bulzacki | G06Q 10/063 |
| 2017/0257094 A1* | 9/2017 | Schupp | G01V 3/08 |
| 2018/0033292 A1* | 2/2018 | Bhat | G07F 19/207 |
| 2018/0198641 A1* | 7/2018 | Gilani | H04L 12/66 |
| 2018/0210541 A1* | 7/2018 | Soni | G06F 3/0482 |
| 2018/0268255 A1* | 9/2018 | Surazhsky | G06N 3/08 |
| 2019/0108734 A1* | 4/2019 | Cook | G08B 13/181 |
| 2019/0340873 A1* | 11/2019 | Shigeta | G07F 17/3251 |

\* cited by examiner

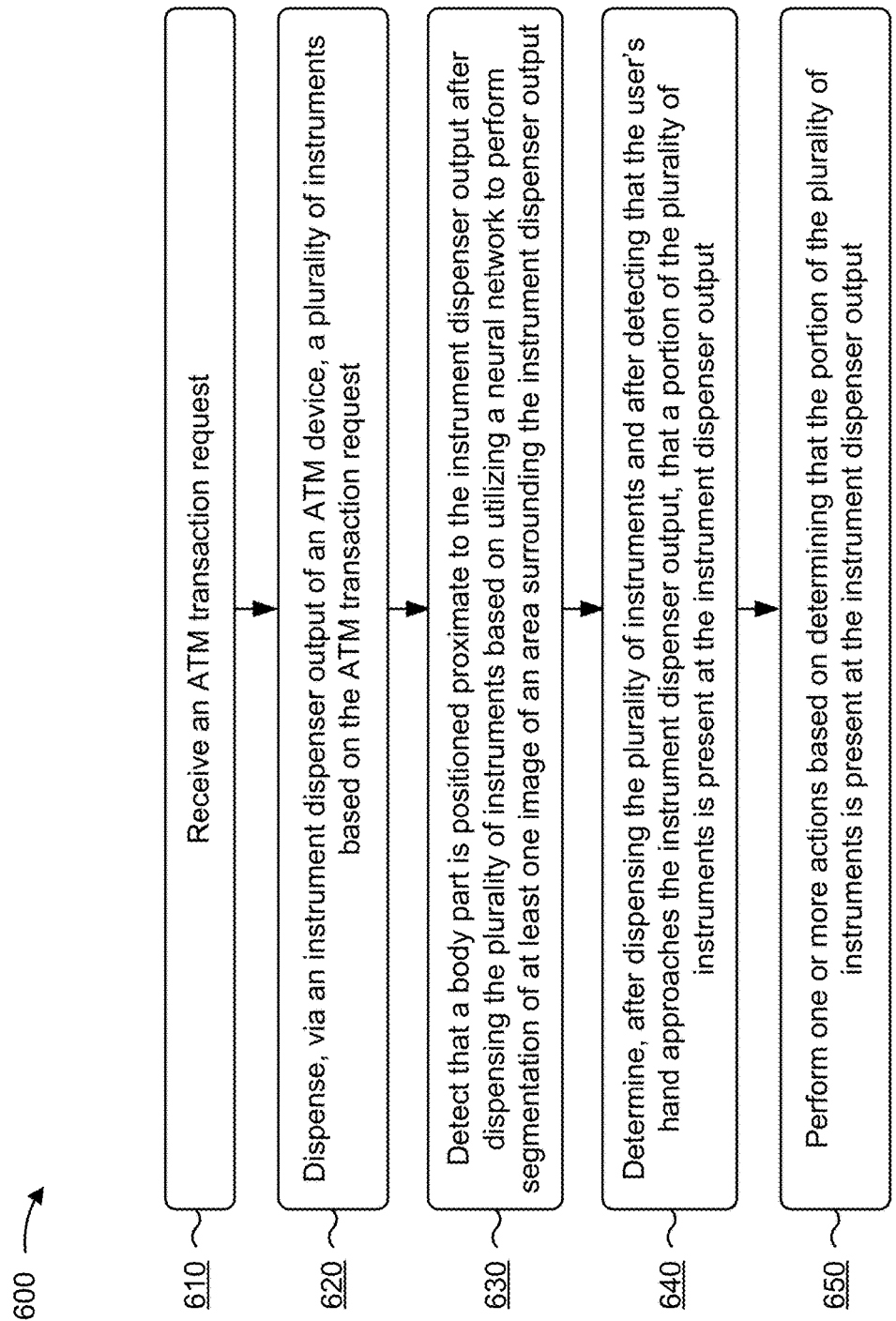

COUNTER-FRAUD MEASURES FOR AN ATM DEVICE

BACKGROUND

Financial institutions, such as banks, are increasingly being targeted by malicious actors. In many cases, a hacker may defraud a bank via the bank's automated teller machine (ATM) devices.

SUMMARY

According to some implementations, an automated teller machine (ATM) device includes an instrument dispenser, one or more memories, and one or more processors. communicatively coupled to the one or more memories. The one or more processors may be configured to receive a request to process an ATM transaction; dispense, via the instrument dispenser, a plurality of instruments based on the request; perform image segmentation of one or more images of an area surrounding the instrument dispenser, wherein the image segmentation is performed using a deep learning network trained using synthetic models of hands; detect, based on performing the image segmentation, that a user's hand approaches the instrument dispenser after dispensing the plurality of instruments; determine, after dispensing the plurality of instruments and after detecting that the user's hand approaches the instrument dispenser, that a portion of the plurality of instruments is present at the instrument dispenser; and perform one or more actions based on determining that the portion of the plurality of instruments is present at the instrument dispenser.

According to some implementations, a method may include monitoring, by an ATM device, a target area of the ATM device by capturing images of the target area using one or more image sensors, the target area being susceptible to intrusion for fraudulent access to the ATM device; performing, by the ATM device, image segmentation of one or more of the images using a deep learning network that is trained to perform the image segmentation using images of synthetic hand models; detecting, by the ATM device, that a user's hand is located proximate to the target area based on performing the image segmentation; and performing, by the ATM device, one or more actions based on detecting that the user's hand is located proximate to the target area.

According to some implementations, a non-transitory computer-readable medium may store one or more instructions that, when executed by one or more processors of an ATM device, cause the one or more processors to receive an ATM transaction request; dispense, via an instrument dispenser of the ATM device, a plurality of instruments based on the ATM transaction request; detect that a body part is positioned proximate to the instrument dispenser after dispensing the plurality of instruments based on utilizing a neural network to perform segmentation of at least one image of an area surrounding the instrument dispenser, wherein the neural network is trained to perform the segmentation based on synthetic models of body parts; determine, after dispensing the plurality of instruments and after detecting that the body part is positioned proximate to the instrument dispenser, whether a portion of the plurality of instruments remains at the instrument dispenser; and perform one or more actions based on determining whether the portion of the plurality of instruments remains at the instrument dispenser.

BRIEF DESCRIPTION OF THE DRAWINGS

FIGS. 4-6 are flow charts of example processes for counter-fraud measures for an ATM device.

DETAILED DESCRIPTION

Figure 1A:
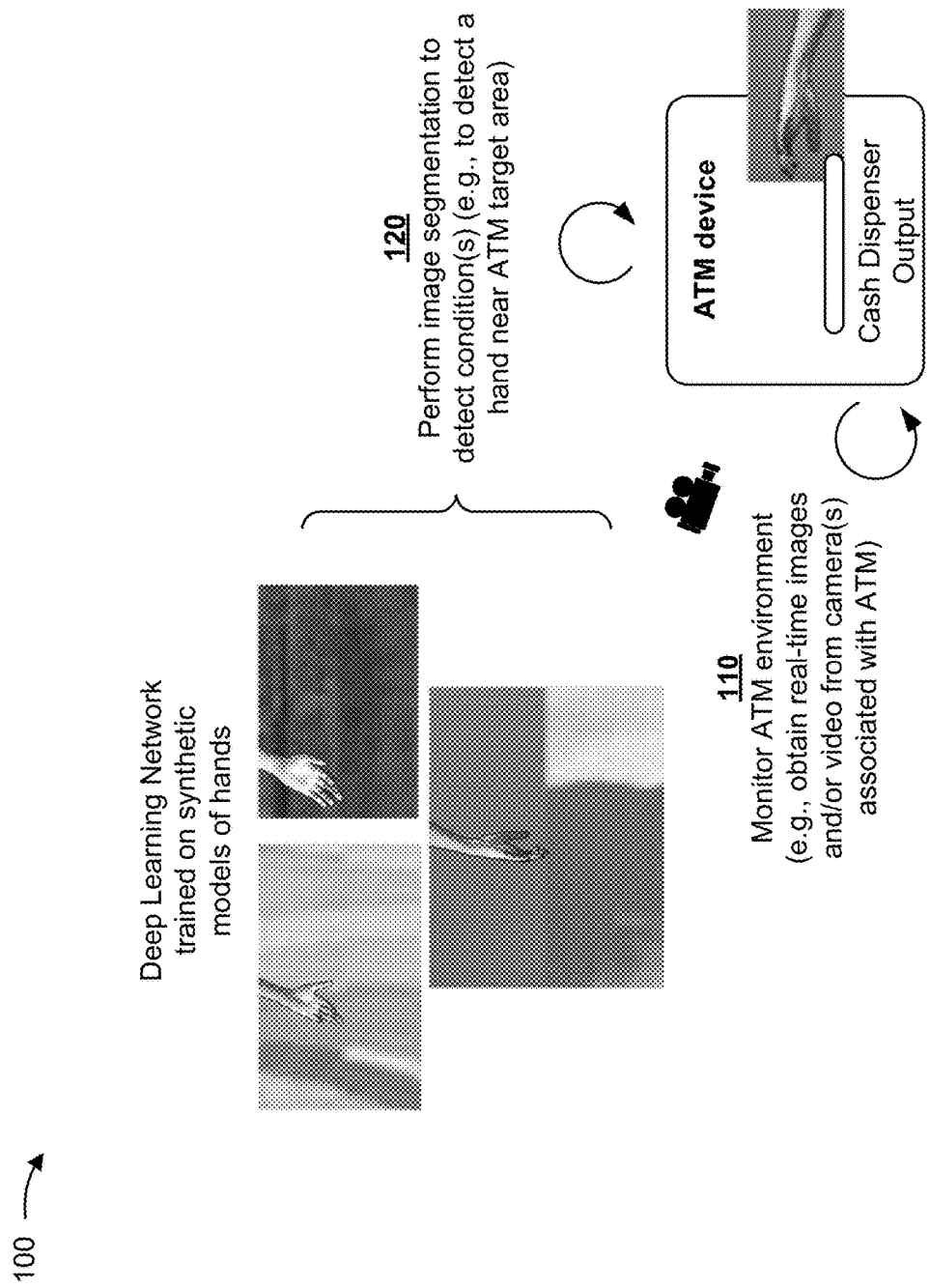
FIGS. 1A-1C are diagrams of one or more example implementations described herein.

The following detailed description of example implementations refers to the accompanying drawings. The same reference numbers in different drawings may identify the same or similar elements.

A typical ATM device may, after dispensing cash in response to an ATM transaction, intake the cash from a cash dispenser output after a certain period of time, on the assumption that a user has forgotten to remove the cash. However, in some cases, a malicious user may take advantage of this loophole by removing some, but not all, of the cash from the cash dispenser output, and immediately filing a claim with the associated bank and requesting for a credit of the entire dispensed amount. Further, in some cases, a malicious actor may improperly bypass a control or security system ("control/security system") of an ATM device (e.g., by drilling a hole into an enclosure of the ATM device, and infecting the ATM device with malicious code, such as in a jackpotting attack), and cause the ATM device to continuously dispense cash. Existing ATM device security mechanisms do not sufficiently address such fraudulent activity. Furthermore, computing resources (e.g., processing resources, memory resources, and/or the like) may be wasted by using such computing resources to identify, investigate, and/or rectify fraudulent activity that could otherwise be prevented.

Some implementations described herein permit an ATM device to detect potential attempts to interfere with the operation of the ATM device, such as potential attempts to conduct fraudulent transactions at the ATM device and/or to hack the ATM device. Furthermore, some implementations described herein permit the ATM device to perform appropriate actions to address such activities, such as by generating an audible alert and/or a visual alert, by logging transaction information, by causing one or more image sensors to capture image(s) of various areas surrounding the ATM device (as part of evidence gathering), by contacting authorities, by diverting any instruments (e.g., cash and/or the like) being reintroduced into an instrument dispenser of the ATM device for later counting, and/or the like. In some implementations, the ATM device may execute, or have access to, a deep learning network that is trained to perform image segmentation based on synthetic models of a human hand. In some implementations, the ATM device may utilize the deep learning network to detect, in real-time (or near real-time), a hand proximate to certain sensitive areas of the ATM device, such as an area proximate to an access panel of the ATM device, an area proximate to an internal control/security system of the ATM device, an area proximate to the instrument dispenser, and/or the like. The ATM device may use such detection as part of determining whether a user is potentially committing a fraudulent activity at the ATM device.

In this way, the ATM device may be configured with counter-fraud measures that deter malicious actors from committing ATM fraud, which improves the overall security of the ATM device. This also reduces the possibility of damage to the ATM device (which may, for example, occur as part of hacking the ATM). Furthermore, computing resources (e.g., processing resources, memory resources, and/or the like) may be conserved by preventing fraudulent activity, where such computing resources would otherwise be needed to identify, investigate, and/or rectify fraudulent activity.

Figure 1B:
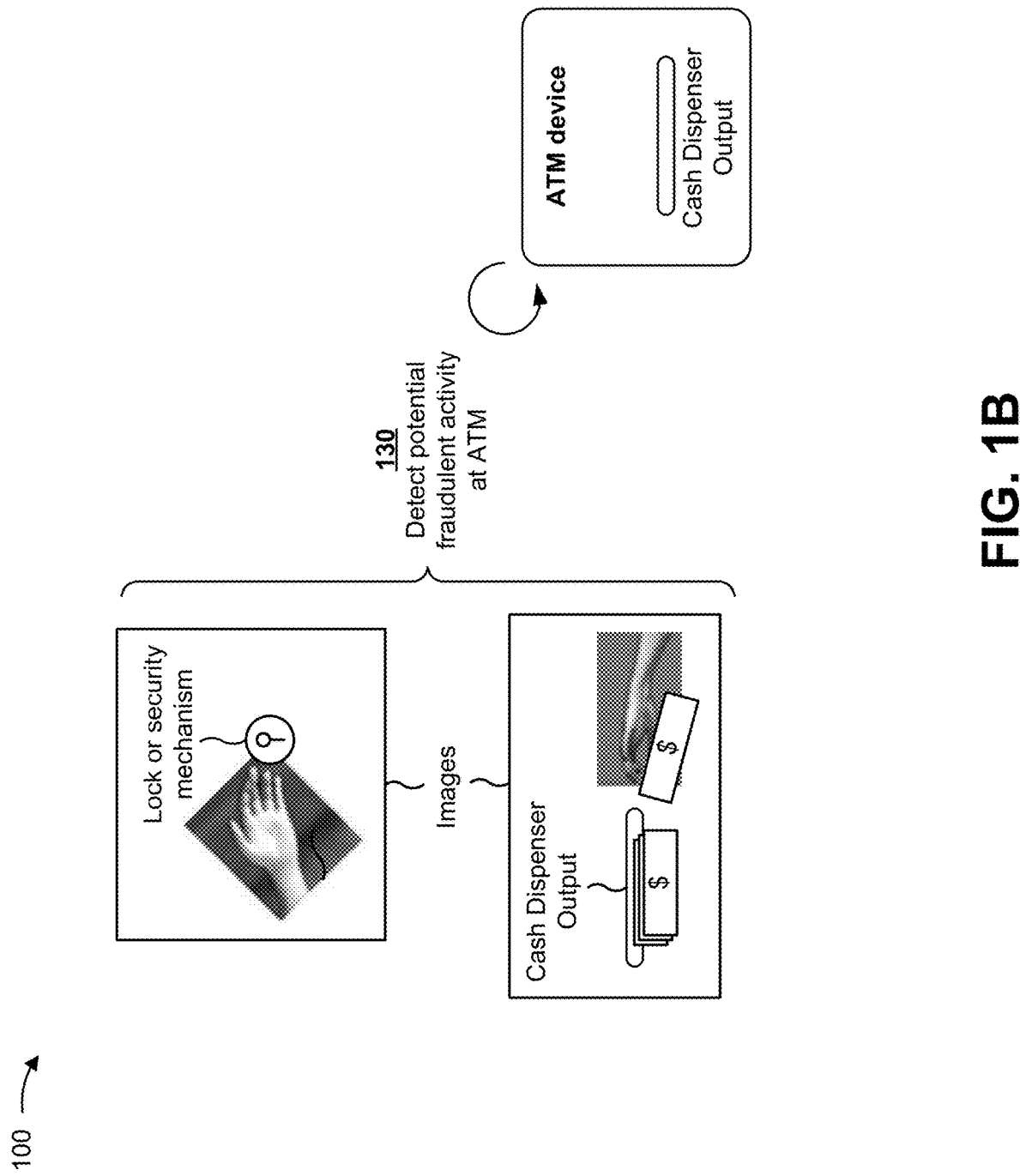
Figure 1C:
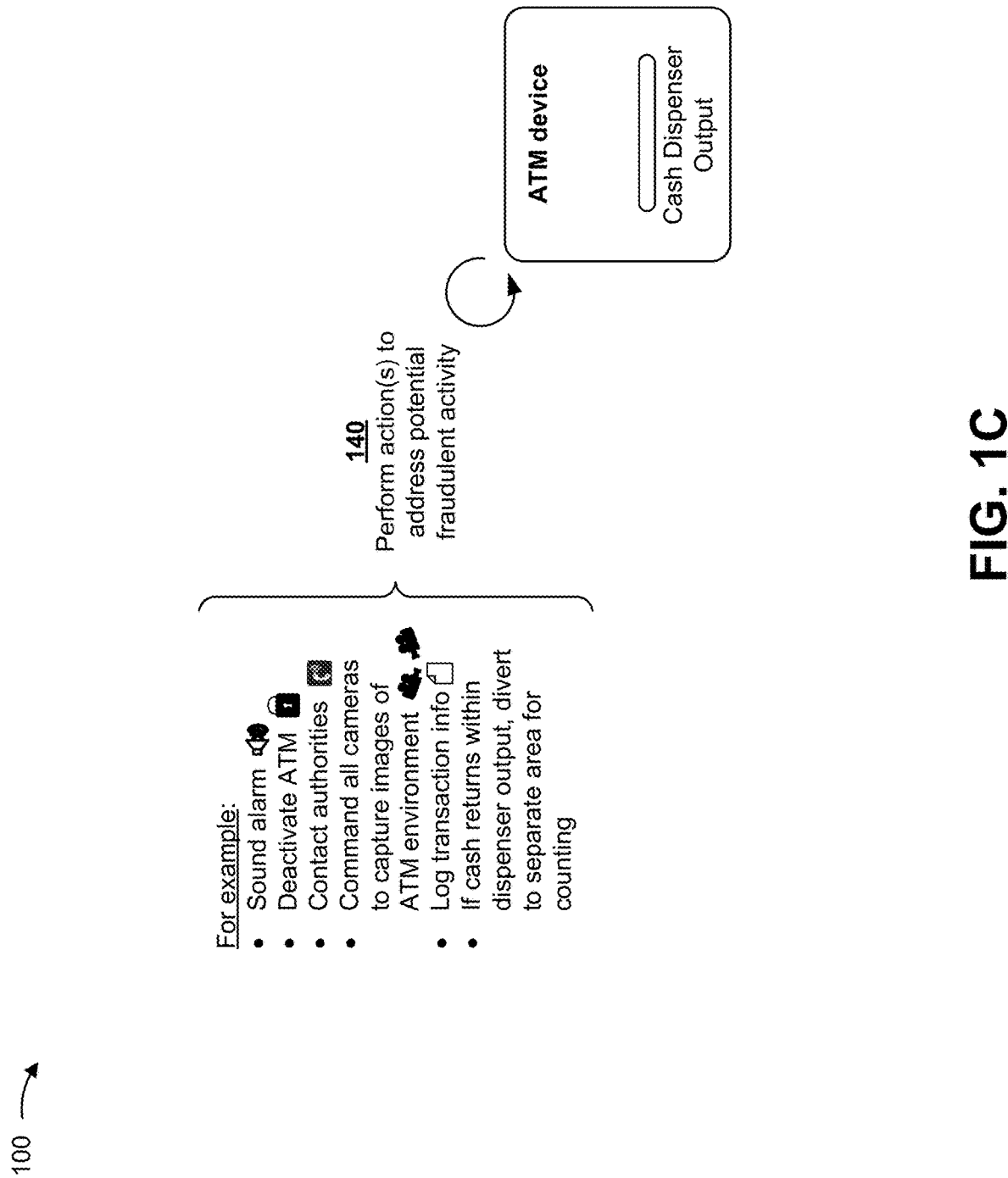

FIGS. 1A-1C are diagrams of one or more example implementations 100 described herein. Example implementation(s) 100 include an ATM device.

In some implementations, the ATM device may include, or be associated with, one or more image sensors (e.g., cameras, camcorders, and/or the like) arranged to capture images of an environment of the ATM device. For example, the image sensors may capture images of a target area of the ATM device, such as a surrounding area of one or more portions of an enclosure of the ATM device that houses internal components (e.g., internal computing device(s), monetary instruments, a control system, and/or the like) of the ATM device, a lock or other security mechanism of the ATM device, an access panel of the ATM device, an area proximate to an instrument dispenser of the ATM device (e.g., configured to dispense cash, transaction cards, cashier's checks, and/or the like), an area where users may be positioned when interacting with the ATM device (e.g., via a keypad, a touch screen, and/or the like), and/or the like. In some implementations, the target area may be an area susceptible to intrusion for fraudulent access to the ATM device and/or susceptible to fraudulent activity being performed in association with the ATM device. In some implementations, the image sensor(s) may be disposed on the ATM device, in the ATM device, on a structure located proximate to the ATM device (e.g., a panel coupled to the enclosure of the ATM device, a ceiling above the ATM device, a wall adjacent the ATM device, and/or the like), and/or the like.

In some implementations, the ATM device may store or have access to a machine learning application (e.g., a deep learning network) that is trained, based on synthetic models, to identify (e.g., in real-time or near real-time) human body parts, such as human hands, in images captured by the image sensor(s). The training platform may be capable of generating synthetic models (e.g., sometimes referred to as virtual objects) of body parts, such as the human hand. In some implementations, a synthetic model may include components that correspond to various parts of a human hand, such as individual components that correspond to fingers, a wrist, a palm, and/or the like of the human hand (along with joints that correspond to the various joints of the human hand). In some implementations, the training platform may be configured to receive data relating to potential poses of a human hand, and utilize the data to generate multiple synthetic models of the human hand. In some implementations, the data may include information that identifies ranges of permissible angular positions relating to the joints associated with parts of a synthetic model, ranges of permissible distances between the components, ranges of permissible sizes of the components, and/or the like.

In some implementations, the training platform may be configured to randomly, or pseudo-randomly, generate multiple synthetic models that each conforms to such permissible ranges. The synthetic models may represent a wide variety of poses of the human hand that are realistic and/or that conform to the natural anatomical limits of the human hand. In some implementations, the training platform may be configured to derive additional synthetic models based on the generated synthetic models (e.g., such as by using different backgrounds for the generated synthetic models), to arrive at a large set of synthetic models, and provide the set of synthetic models (along with accurate labels) to a deep learning network to train the deep learning network to perform image segmentation, object recognition, motion recognition, and/or the like. In this way, the training platform generates high-quality synthetic models (e.g., virtual objects) that are sufficiently realistic to accurately train a deep learning network to recognize images of actual human hands and/or particular motions or activities of a human hand. Additionally, or alternatively, the deep learning network may be trained to detect motion indicative of performing fraudulent activity, such as by analyzing sequences of images in which fraudulent activity occurs (e.g., jackpotting attacks, ATM break-ins, and/or the like).

In some implementations, the training platform may be implemented on the ATM device (e.g., using one or more processors and/or one or more memories of the ATM device). Alternatively, the training platform may be implemented on a device separate from the ATM device, such as a training device (e.g., a server or a group of servers). In this case, the training device may provide the trained deep learning network for use by the ATM device. For example, the training device may transmit the deep learning network to the ATM device so that the deep learning network can be executed by the ATM device. Alternatively, the ATM device may have access to the trained deep learning network, which may be stored and/or executed elsewhere (e.g., on the training device, in a cloud computing environment, and/or the like).

As shown by reference number 110, the ATM device may monitor an environment of the ATM device. For example, the ATM device may cause the image sensor(s) to capture images and/or video frames (e.g., in real time or near real-time). In some implementations, the ATM device may cause the image sensor(s) to capture images and/or video frames continuously, repeatedly, or periodically.

As shown by reference number 120, the ATM device may perform segmentation of the images and/or video frames to detect certain condition(s). For example, the condition(s) may include a hand entering into an area proximate to the instrument dispenser of the ATM device and subsequently exiting the area. Additionally, or alternatively, the condition(s) may include a hand being located proximate to a portion of the enclosure of the ATM device (e.g., for longer than a threshold period of time), such as proximate to a lock or other security mechanism of the ATM device, proximate to the control/security system of the ATM device, and/or the like. Additionally, or alternatively, the condition(s) may include a hand moving in a particular manner (e.g., a manner indicative of performing fraudulent activity), such as a twisting motion, a pulling motion, a hammering motion, and/or the like. In some implementations, the ATM device may store information that identifies such hand motions indicative of performing fraudulent activity, and/or the deep learning network may be trained to identify such motions. In some implementations, the ATM device may utilize the deep learning network to perform the segmentation.

As shown in FIG. 1B, and by reference number 130, the ATM device may detect potentially fraudulent activity at the ATM device based on the segmentation. For example, the ATM device may determine, based on the segmentation, that a hand is located proximate to a lock or other security mechanism of the ATM device. Additionally, or alternatively, the ATM device may determine that a hand is near a portion of the enclosure of the ATM device that is proximate to the control system of the ATM device. Additionally, or alternatively, the ATM device may determine that a hand is near a portion of an access panel of the ATM device. Additionally, or alternatively, the ATM device may determine that a hand is near a sensitive area of the ATM device (e.g., a lock, security mechanism, control system, access panel, an instrument dispenser, and/or the like) for an amount of time that satisfies a threshold. Additionally, or alternatively, the ATM device may determine that the hand moves in a particular manner, as described above. In some implementations, the ATM device may determine that the hand moves in a particular manner and is located near a sensitive area of the ATM device (e.g., for a threshold amount of time). As a result, the ATM device may determine that a malicious user might be attempting to gain access to the control system of the ATM device (e.g., as part of a jackpotting attack or an ATM break-in).

In some implementations, the ATM device may generate a fraud score based on performing the image segmentation and/or processing one or more images. For example, the ATM may generate the fraud score based on one or more determinations described above. In some implementations, the ATM device may apply different weights to different determinations to calculate the fraud score. For example, the ATM device may apply a lower weighting to a determination that a hand is in proximity of a target area, and may apply a higher weighting to a determination that a hand moves in a manner consistent with performing a fraudulent activity. If the fraud score satisfies a threshold, then the ATM device may perform one or more actions to address the potentially fraudulent activity. In some implementations, different thresholds may correspond to different actions. For example, the ATM device may output an alarm (e.g., an audible and/or visual alarm) if the fraud score satisfies a first threshold (e.g., if the fraud score is greater than or equal to a lower threshold), and the ATM device may deactivate itself and/or notify law enforcement if the fraud score satisfies a second threshold (e.g., if the fraud score is greater than or equal to a higher threshold).

As another example, the ATM device may receive a request to process an ATM transaction (e.g., to dispense one or more instruments, such as cash), and may process the ATM transaction request by dispensing instruments from the instrument dispenser. The ATM device may be configured to monitor an ATM environment using one or more image sensors to capture images that include the instrument dispenser based on dispensing the instruments. In this case, the ATM device may use image segmentation to determine that after the instruments are dispensed from the instrument dispenser, a user interacts with the instrument dispenser.

For example, the ATM device may determine that the user's hand approaches the instrument dispenser and then moves away from the instrument dispenser, and that cash still remains in the instrument dispenser after the hand moves away. The ATM device may determine that cash still remains after detecting that the hand moves away from the instrument dispenser based on image processing (e.g., image segmentation) and/or based on one or more signals provided by a sensor configured to detect instruments in the instrument dispenser. In this case, the ATM device may determine that the user likely retrieved only some of the dispensed cash and left a remainder of the dispensed cash in the instrument dispenser. In some implementations, the ATM device may initiate a timer upon or after dispensing the instruments from the instrument dispenser, upon or after detecting a hand approach and move away from the instrument dispenser, and/or the like. The ATM device may determine whether a portion of the dispensed instruments is present or remains at the instrument dispenser upon or after expiration of the timer. The ATM device may detect potentially fraudulent activity at the ATM device based on a result of this determination (e.g., when at least one instrument remains in the instrument dispenser after expiration of the timer).

In some implementations, the ATM device may be configured to determine that a hand is located in a particular area relative to the ATM device based on information regarding the ATM device (e.g., information regarding a physical layout of the ATM device, information regarding a make or model of the ATM device, information regarding a device type of the ATM device, and/or the like) and/or positions of the image sensor(s) relative to the ATM device. For example, if a particular image sensor is positioned to capture images of an area surrounding the instrument dispenser, where the area would appear in a left half of any of such images, the ATM device may determine a potentially fraudulent activity if a hand is detected in a left half of a given image (and not if a hand is detected in a right half of the image).

As shown in FIG. 1C, and by reference number 140, the ATM device may perform one or more actions to address the potentially fraudulent activity. For example, in a case where the ATM device determines that a malicious user might be attempting to gain access to the control system of the ATM device (e.g., as part of a jackpotting attack), the ATM device may generate an alert (e.g., a visual alert on a display of the ATM device, an audible alert, and/or the like) as an attempt to deter the malicious user from accessing the control system. Additionally, or alternatively, the ATM device may deactivate the ATM device, such as by disconnecting the ATM device from electrical power, powering down the ATM device, and/or the like. Additionally, or alternatively, the ATM device may issue a notification to authorities (e.g., via a direct communication line, phone, text message, and/or the like to a law enforcement authority).

As another example, in a case where the ATM device determines that, as part of an ATM transaction, a user has retrieved only some of the dispensed cash from the instrument dispenser, the ATM device may store a log of the ATM transaction. The log may include transaction information associated with the transaction, such as a date and/or time associated with the transaction, an account associated with the transaction (e.g., a bank account associated with a withdrawal), user information associated with the transaction (e.g., a name associated with the account, an address associated with the account, and/or the like), an amount of the transaction (e.g., an amount of the withdrawal), and/or the like. In some implementations, the ATM device may determine an amount of money left in the instrument dispenser and retrieved back within the ATM device, and may store this information in the log as part of the transaction information. The transaction information in the log may be stored in memory of the ATM device and/or transmitted to another device (e.g., a backend server, a device associated with law enforcement, and/or the like). Additionally, or alternatively, the transaction information may be included in a message sent to a device associated with law enforcement.

Additionally, or alternatively, the ATM device may generate an alert (e.g., a visual alert on the display of the ATM device or proximate to the instrument dispenser, an audible alert, and/or the like) so as to notify the user that the user has not removed all of the cash from the instrument dispenser. Additionally, or alternatively, the ATM device may cause any remainder of the cash in the instrument dispenser, that returns within the ATM device, to be diverted to a separate area for subsequent counting (e.g., as part of investigating any claim that the user may file). For example, the ATM device may include a first instrument storage area, internal to the ATM device, where instruments are stored prior to being dispensed via the instrument dispenser. In this case, the ATM device may divert instruments that return to the ATM device (e.g., instruments that are not retrieved from the instrument dispenser), to a second instrument storage area, internal to the ATM device, that is separate from the first instrument storage area. In this way, the unclaimed instruments can be tracked and identified.

In some implementations, the ATM device may include multiple separate instrument storage areas for storing instruments that are unclaimed and returned to an interior of the ATM device. When one or more instruments are unclaimed, the ATM device may divert those instruments to an instrument storage area and may store information associated with the transaction that resulted in the return of those instrument(s). Such information may identify, for example, an account associated with the transaction, a user identifier associated with the transaction, and/or the like. In some implementations, the ATM device may store information that identifies an association between the transaction information and the instrument storage area that stores the instruments associated with the transaction so that, for example, a user and/or an account associated with the remaining instruments can be identified.

In any case, in some implementations, the ATM device may instruct the image sensor(s) (e.g., all of the image sensors or a subset of the image sensor(s)) to capture images and/or video frames of the environment of the ATM device so as to gather further evidence (including, for example, images of the user or malicious actor, other perpetrators nearby, and/or the like) that might be useful in investigating the potentially fraudulent activity. For example, the ATM device may activate one or more image sensors to capture images of a user based on detecting potentially fraudulent activity.

In some implementations, the ATM device may cause a door to be temporarily locked (e.g., a door used to access a location where the ATM device is located, such as a room, a foyer, a lobby, and/or the like). In some implementations, the door may temporarily lock while the ATM device causes one or more image sensors to capture images of the user. Additionally, or alternatively, the ATM device may cause a camera that is located in the room and/or a location of the ATM device to turn on and/or to capture images of the user. Additionally, or alternatively, the ATM device may output an audible sound and/or flash a message on the display to attempt to get the user to turn toward the ATM device so that an image of the user can be captured.

In this way, the ATM device may be configured with counter-fraud measures that deter malicious actors from committing ATM fraud, which improves the overall security of the ATM device. This also reduces the possibility of damage to the ATM device (which may, for example, occur as part of hacking the ATM).

In some implementations, one or more operations described above may be overridden for performing maintenance on the ATM device (e.g., refilling the ATM device with instruments like cash, performing repair or inspection of the ATM device, and/or the like). In this case, the ATM device may receive input that indicates that maintenance is to be performed on the ATM device (e.g., using a credential, a code, and/or the like). In this case, the ATM device may refrain from performing one or more of the above operations (e.g., obtaining images, segmenting and/or analyzing the images, and/or the like), thereby conserving computing resources and memory resources of the ATM device.

Although some implementations described herein involve continuously, repeatedly, or periodically capturing images and/or video frames of an environment of the ATM device, in some implementations, the ATM device may cause the image sensor(s) to capture images and/or video frames upon or after an ATM transaction request is received at the ATM device, upon or after instruments are dispensed from the instrument dispenser, upon or after motion sensor(s) and/or the like (e.g., included in or communicatively coupled to the ATM device) provide signal(s) indicating that a user is present at or near the ATM device, and/or the like. This conserves power resources, processing resources, and memory resources that may otherwise need to be expended to capture images and/or video frames when no user is present at the ATM device. Furthermore, implementations described herein may apply equally to other types of systems that dispense items, such as vending machines and/or the like. Furthermore, one or more operations described herein as being performed by the ATM device may be performed by another device, such as a server. In some implementations, the ATM device may be in communication with the server such that the ATM device can request information from the server. The server may determine the information using the one or more operations and/or based on the request from the ATM device, and the server may provide such information to the ATM device.

As indicated above, FIGS. 1A-1C are provided merely as examples. Other examples are possible and may differ from what was described with regard to FIGS. 1A-1C.

Figure 2:
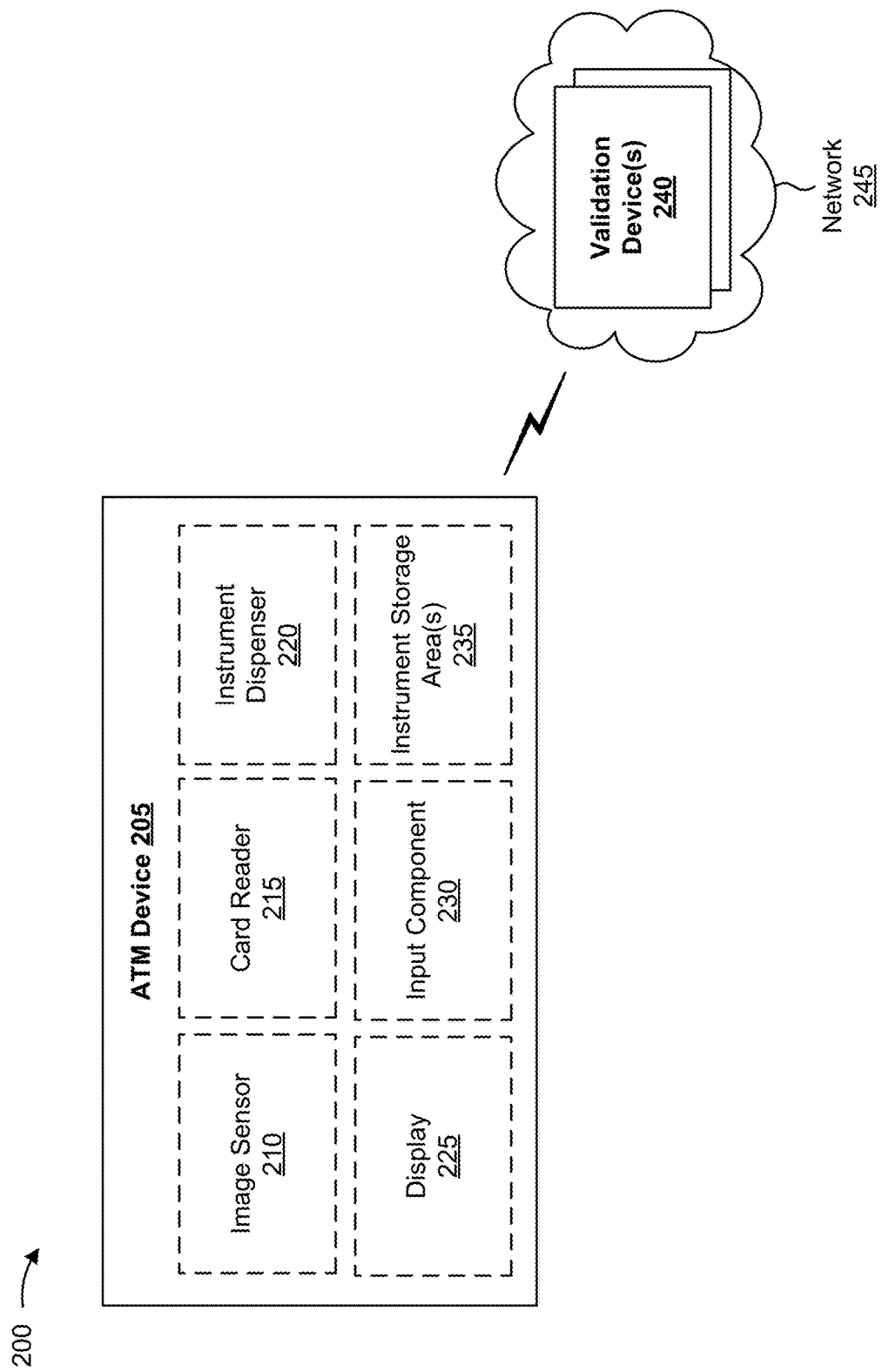
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an ATM device 205, which may include an image sensor 210, a card reader 215, an instrument dispenser 220, a display 225, an input component 230, and/or one or more instrument storage areas 235. Environment 200 may also include one or more validation devices 240 and a network 245. Devices of environment 200 may interconnect via wired connections, wireless connections, or a combination of wired and wireless connections.

ATM device 205 includes one or more devices capable of performing various types of financial transactions, such as a cash withdrawal, a money deposit (e.g., a check or cash deposit), a money transfer (e.g., a transfer from one bank account to another bank account), access to information related to an account (e.g., a bank account, a checking account, a credit card account, etc.), and/or the like. For example, ATM device 205 may include an ATM, an automated banking machine (ABM), a cash point, a Cashline®, a Minibank®, a cash machine, a Tyme® machine, a cash dispenser, a Bankomat®, a Bancomat®, and/or a similar type of device. In some implementations, ATM device 205 may include, or have access to, a neural network (e.g., a deep learning network and/or the like) trained, based on synthetic models of body parts, such as hands, to perform image segmentations, and may utilize the neural network to detect potentially fraudulent activity at the ATM device, as described elsewhere herein.

Image sensor 210 includes one or more cameras or one or more electronic devices that incorporate camera(s) for capturing images or video. In some implementations, image sensor 210 may be configured to capture images or video of an environment of an ATM device (e.g., ATM device 205), as described elsewhere herein.

Card reader 215 includes one or more components capable of reading information from a transaction card or another type of device that stores account information, such as a smart phone with near-field communication capability. For example, card reader 215 may include a component that permits a card to be inserted into the ATM device 205 so that information can be read from the card (e.g., to identify an account associated with the card). The card may include, for example, a debit card, a bank card, a credit card, and/or the like.

Instrument dispenser 220 includes one or more components capable of dispensing instruments, stored or housed within the ATM device 205, to an environment external from the ATM device 205. For example, instrument dispenser 220 may include a cash dispenser or a similar type of dispenser. An instrument may include, for example, a cash, a card (e.g., a gift card, a transaction card, and/or the like), a cashier's check, and/or the like. In some implementations, instrument dispenser 220 includes one or more instrument sensors for detecting whether instruments are held in the instrument dispenser 220. Additionally, or alternatively, instrument dispenser 220 may include a component capable of retracting instruments that have been dispensed. For example, after one or more instruments have been dispensed from instrument dispenser 220 to an environment external from the ATM device 205, an actuator of instrument dispenser 220 may retract the instrument(s) back within a housing of the ATM device 205 if the instrument(s) remain held by the instrument dispenser 220 (e.g., have not been taken by a user) after a threshold amount of time has elapsed.

Display 225 includes one or more components capable of displaying information and/or outputting information (e.g., visual information, audible information, and/or the like). For example, display 225 may include a screen for displaying information associated with an account, for displaying transaction information, for displaying information that assist a user with performing a transaction, that outputs one or more alerts, and/or the like. In some implementations, display 225 is a touch screen display capable of receiving user input to assist with performing a transaction.

Instrument storage area 235 includes one or more components capable of storing and/or housing instruments within the ATM device 205 (e.g., internal to the ATM device 205). In some implementations, ATM device 205 includes multiple instrument storage areas 235. For example, ATM device 205 may include a first instrument storage area 235 that holds instruments that have not yet been dispensed by the instrument dispenser 220. Additionally, or alternatively, the ATM device 205 may include a second instrument storage area 235 that holds instruments that have been dispensed and subsequently retracing back within the ATM device 205.

Validation device 240 includes one or more devices capable of validating user authentication credential information for account access. For example, validation device 240 may include a server, a cloud computing device, a transaction backend, or another type of computing device.

Network 245 includes one or more wired and/or wireless networks. For example, network 245 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
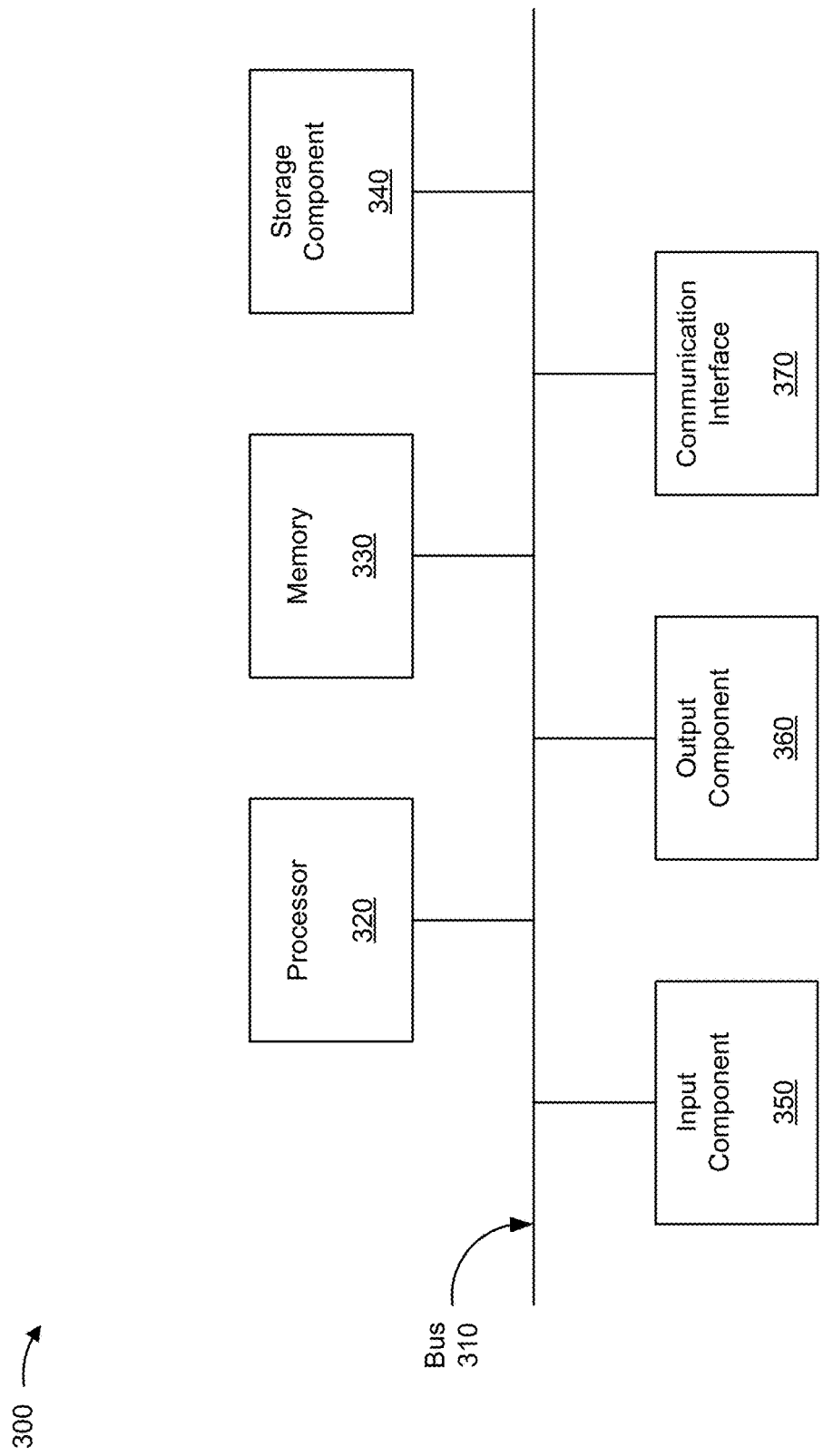
FIG. 3 is a diagram of example components of one or more devices of FIG. 2.

FIG. 3 is a diagram of example components of a device 300. Device 300 may correspond to ATM device 205 and/or validation device 240. In some implementations, ATM device 205 and/or validation device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an image processor, an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. In some implementations, processor 320 is an image processor capable of applying a deep learning network to perform image segmentation. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, an actuator, and/or image sensor(s) (e.g., camera(s))). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
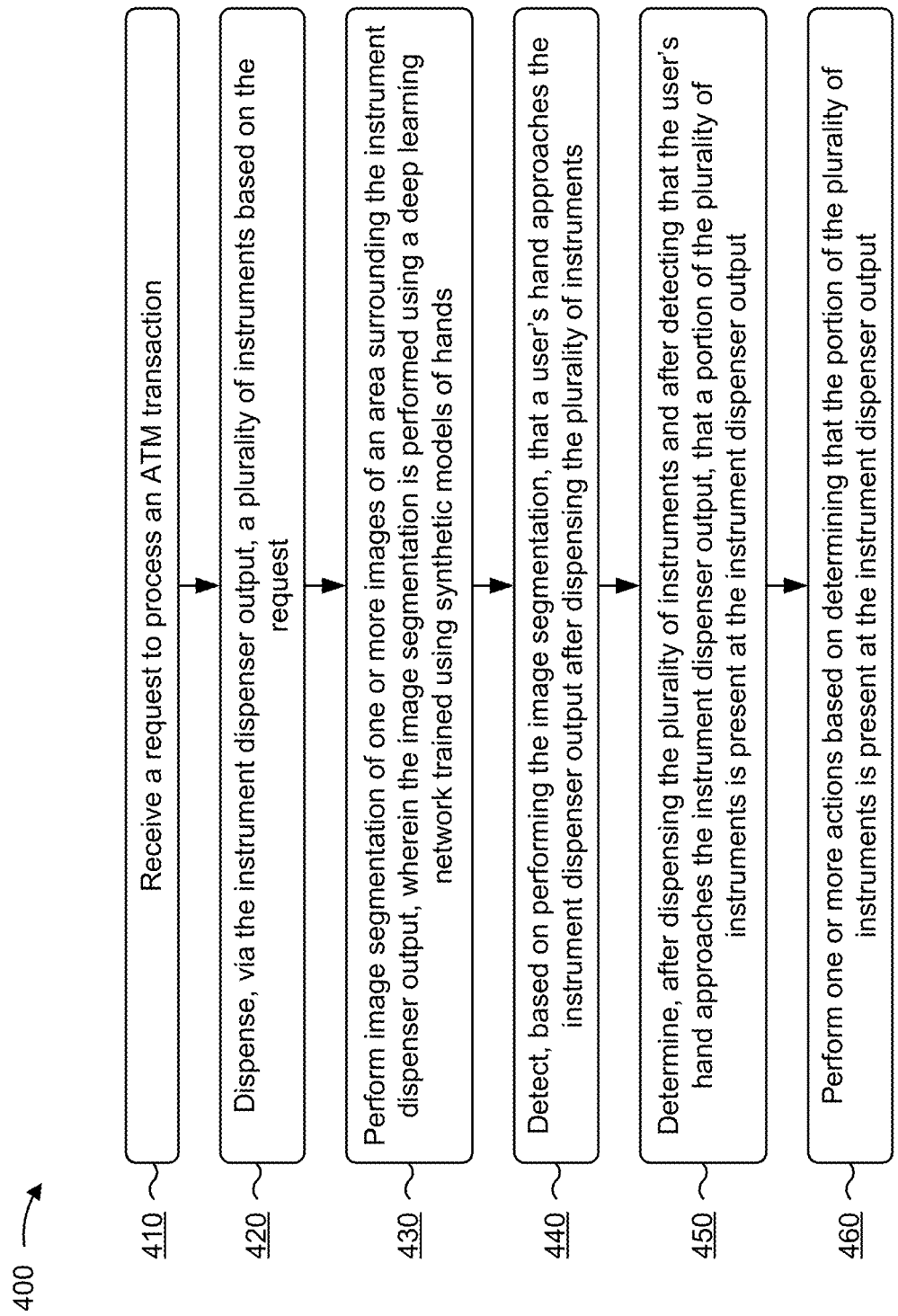

FIG. 4 is a flow chart of an example process 400 for counter-fraud measures for an ATM device. In some implementations, one or more process blocks of FIG. 4 may be performed by an ATM device (e.g., ATM device 205). In some implementations, one or more process blocks of FIG. 4 may be performed by another device or a group of devices separate from or including the ATM device, such as a validation device (e.g., validation device 240).

As shown in FIG. 4, process 400 may include receiving a request to process an ATM transaction (block 410). For example, the ATM device (e.g., input component 230, processor 320, memory 330, input component 350, and/or the like) may receive a request to process an ATM transaction, as described above.

As further shown in FIG. 4, process 400 may include dispensing, via the instrument dispenser, a plurality of instruments based on the request (block 420). For example, the ATM device (e.g., using instrument dispenser 220 and/or the like) may dispense, via the instrument dispenser, a plurality of instruments based on the request, as described above.

As further shown in FIG. 4, process 400 may include performing image segmentation of one or more images of an area surrounding the instrument dispenser, wherein the image segmentation is performed using a deep learning network trained using synthetic models of hands (block 430). For example, the ATM device (e.g., using processor 320, memory 330, storage component 340, input component 350, output component 360, communication interface 370, and/or the like) may perform image segmentation of one or more images of an area surrounding the instrument dispenser, as described above. In some implementations, the image segmentation is performed using a deep learning network trained using synthetic models of hands.

As further shown in FIG. 4, process 400 may include detecting, based on performing the image segmentation, that a user's hand approaches the instrument dispenser after dispensing the plurality of instruments (block 440). For example, the ATM device (e.g., using image sensor 210, processor 320, memory 330, and/or the like) may detect, based on performing the image segmentation, that a user's hand approaches the instrument dispenser after dispensing the plurality of instruments, as described above.

As further shown in FIG. 4, process 400 may include determining, after dispensing the plurality of instruments and after detecting that the user's hand approaches the instrument dispenser, that a portion of the plurality of instruments is present at the instrument dispenser (block 450). For example, the ATM device (e.g., using image sensor 210, instrument dispenser 220, processor 320, memory 330, and/or the like) may determine, after dispensing the plurality of instruments and after detecting that the user's hand approaches the instrument dispenser, that a portion of the plurality of instruments is present at the instrument dispenser, as described above.

As further shown in FIG. 4, process 400 may include performing one or more actions based on determining that the portion of the plurality of instruments is present at the instrument dispenser (block 460). For example, the ATM device (e.g., using image sensor 210, instrument dispenser 220, display 225, instrument storage area 235, processor 320, memory 330, storage component 340, input component 350, output component 360, communication interface 370, and/or the like) may perform one or more actions based on determining that the portion of the plurality of instruments is present at the instrument dispenser, as described above.

Process 400 may include additional implementations, such as any single implementation or any combination of implementations described below and/or in connection with one or more other processes described elsewhere herein.

In a first implementation, the one or more actions include storing a log regarding the ATM transaction. In a second implementation, alone or in combination with the first implementation, the one or more actions include causing the ATM device to intake the portion of the plurality of instruments from the instrument dispenser; and diverting the portion of the plurality of instruments to a storage area separate from an area in which other instruments are stored. In a third implementation, alone or in combination with one or more of the first through second implementations, process 400 includes storing information that identifies an association between transaction information, associated with the ATM transaction, and the storage area.

In a fourth implementation, alone or in combination with one or more of the first through third implementations, process 400 includes causing one or more image sensors, associated with the ATM device, to capture the one or more images of the area surrounding the instrument dispenser. In a fifth implementation, alone or in combination with one or more of the first through fourth implementations, causing the one or more image sensors to capture the one or more images includes causing the one or more image sensors to capture the one or more images before dispensing the plurality of instruments. In a sixth implementation, alone or in combination with one or more of the first through fifth implementations, determining that the portion of the plurality of instruments is present at the instrument dispenser includes determining that the portion of the plurality of instruments is present at the instrument dispenser based on an output signal provided by a sensor configured to detect instruments at the instrument dispenser.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
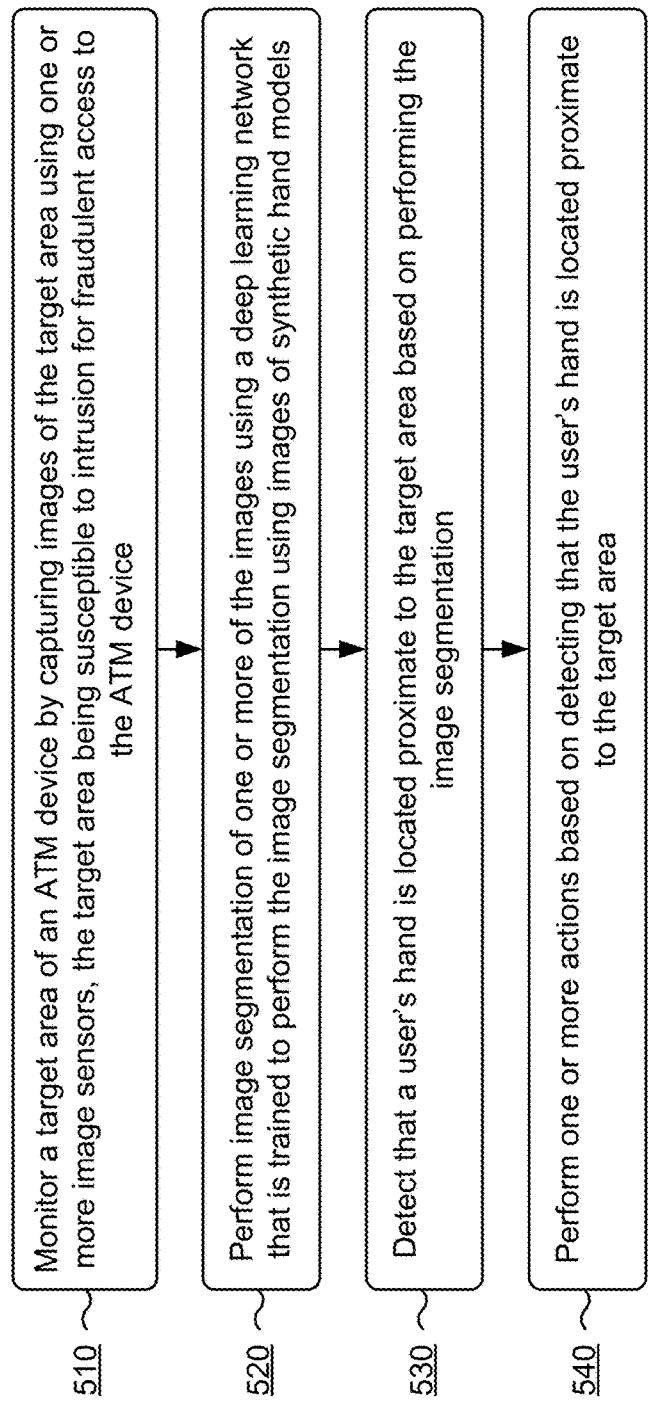

FIG. 5 is a flow chart of an example process 500 for counter-fraud measures for an ATM device. In some implementations, one or more process blocks of FIG. 5 may be performed by an ATM device (e.g., ATM device 205). In some implementations, one or more process blocks of FIG. 5 may be performed by another device or a group of devices separate from or including the ATM device, such as a validation device (e.g., validation device 240).

As shown in FIG. 5, process 500 may include monitoring a target area of the ATM device by capturing images of the target area using one or more image sensors, the target area being susceptible to intrusion for fraudulent access to the ATM device (block 510). For example, the ATM device (e.g., using image sensor 210, processor 320, memory 330, and/or the like) may monitor a target area of the ATM device by capturing images of the target area using one or more image sensors, as described above. In some implementations, the target area is susceptible to intrusion for fraudulent access to the ATM device.

As further shown in FIG. 5, process 500 may include performing image segmentation of one or more of the images using a deep learning network that is trained to perform the image segmentation using images of synthetic hand models (block 520). For example, the ATM device (e.g., using image sensor 210, processor 320, memory 330, storage component 340, communication interface 370, and/or the like) may perform image segmentation of one or more of the images using a deep learning network that is trained to perform the image segmentation using images of synthetic hand models, as described above.

As further shown in FIG. 5, process 500 may include detecting that a user's hand is located proximate to the target area based on performing the image segmentation (block 530). For example, the ATM device (e.g., using image sensor 210, processor 320, memory 330, and/or the like) may detect that a user's hand is located proximate to the target area based on performing the image segmentation, as described above.

As further shown in FIG. 5, process 500 may include performing one or more actions based on detecting that the user's hand is located proximate to the target area (block 540). For example, the ATM device (e.g., using image sensor 210, instrument dispenser 220, display 225, instrument storage area 235, processor 320, memory 330, storage component 340, input component 350, output component 360, communication interface 370, and/or the like) may perform, by the ATM device, one or more actions based on detecting that the user's hand is located proximate to the target area, as described above.

Process 500 may include additional implementations, such as any single implementation or any combination of implementations described below and/or in connection with one or more other processes described elsewhere herein.

In a first implementation, the target area includes a portion of an access panel of an enclosure of the ATM device. In a second implementation, alone or in combination with the first implementation, the target area includes a portion of an enclosure, of the ATM device, proximate to an internal computing device of the ATM device. In a third implementation, alone or in combination with one or more of the first through second implementations, the one or more actions include generating an audible alert and/or a visual alert. In a fourth implementation, alone or in combination with one or more of the first through third implementations, the one or more actions include instructing the one or more image sensors to capture additional images of the target area and/or of a vicinity of the ATM device.

In a fifth implementation, alone or in combination with one or more of the first through fourth implementations, the one or more actions include deactivating the ATM device. In a sixth implementation, alone or in combination with one or more of the first through fifth implementations, the one or more actions include issuing a notification, that identifies a potentially fraudulent activity at the ATM device, to a local law enforcement authority and/or to an entity associated with the ATM device. In a seventh implementation, alone or in combination with one or more of the first through sixth implementations, process 500 includes detecting that the user's hand is located proximate to the target area for a threshold amount of time or that the user's hand moves in a manner indicative of performing fraudulent activity; and performing the one or more actions based on detecting that the user's hand is located proximate to the target area for the threshold amount of time or that the user's hand moves in the manner indicative of performing fraudulent activity.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for counter-fraud measures for an ATM device. In some implementations, one or more process blocks of FIG. 6 may be performed by an ATM device (e.g., ATM device 205). In some implementations, one or more process blocks of FIG. 6 may be performed by another device or a group of devices separate from or including the ATM device, such as a validation device (e.g., validation device 240).

As shown in FIG. 6, process 600 may include receiving an ATM transaction request (block 610). For example, the ATM device (e.g., input component 230, processor 320, memory 330, input component 350, and/or the like) may receive an ATM transaction request, as described above.

As further shown in FIG. 6, process 600 may include dispense, via an instrument dispenser of the ATM device, a plurality of instruments based on the ATM transaction request (block 620). For example, the ATM device (e.g., using instrument dispenser 220 and/or the like) may dispense, via an instrument dispenser of the ATM device, a plurality of instruments based on the ATM transaction request, as described above.

As further shown in FIG. 6, process 600 may include detecting that a body part is positioned proximate to the instrument dispenser after dispensing the plurality of instruments based on utilizing a neural network to perform segmentation of at least one image of an area surrounding the instrument dispenser, wherein the neural network is trained to perform the segmentation based on synthetic models of body parts (block 630). For example, the ATM device (e.g., using image sensor 210, processor 320, memory 330, and/or the like) may detect that a body part is positioned proximate to the instrument dispenser after dispensing the plurality of instruments, as described above. In some implementations, the detection may be based on utilizing a neural network to perform segmentation of at least one image of an area surrounding the instrument dispenser. In some implementations, the neural network is trained to perform the segmentation based on synthetic models of body parts.

As further shown in FIG. 6, process 600 may include determining, after dispensing the plurality of instruments and after detecting that the body part is positioned proximate to the instrument dispenser, whether a portion of the plurality of instruments remains at the instrument dispenser (block 640). For example, the ATM device (e.g., using image sensor 210, instrument dispenser 220, processor 320, memory 330, and/or the like) may determine, after dispensing the plurality of instruments and after detecting that the body part is positioned proximate to the instrument dispenser, as described above. In some implementations, a portion of the plurality of instruments remains at the instrument dispenser.

As further shown in FIG. 6, process 600 may performing one or more actions based on determining whether the portion of the plurality of instruments remains at the instrument dispenser (block 650). For example, the ATM device (e.g., using image sensor 210, instrument dispenser 220, display 225, instrument storage area 235, processor 320, memory 330, storage component 340, input component 350, output component 360, communication interface 370, and/or the like) may perform one or more actions based on determining whether the portion of the plurality of instruments remains at the instrument dispenser, as described above.

Process 600 may include additional implementations, such as any single implementation or any combination of implementations described below and/or in connection with one or more other processes described elsewhere herein.

In a first implementation, process 600 includes causing one or more image sensors, associated with the ATM device, to capture the at least one image of the area surrounding the instrument dispenser; and capturing the at least one image may include causing the one or more image sensors to capture the at least one image after dispensing the plurality of instruments. In a second implementation, alone or in combination with the first implementation, process 600 includes causing one or more image sensors, associated with the ATM device, to capture the at least one image of the area surrounding the instrument dispenser; and causing the one or more image sensors to capture the at least one image includes causing the one or more image sensors to capture the at least one image upon or after receiving the ATM transaction request.

In a third implementation, alone or in combination with one or more of the first through second implementations, process 600 includes causing one or more image sensors, associated with the ATM device, to capture the at least one image of the area surrounding the instrument dispenser; and causing the one or more image sensors to capture the at least one image includes causing the one or more image sensors to capture images. In a fourth implementation, alone or in combination with one or more of the first through third implementations, the one or more actions include generating an audible alert and/or a visual alert.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An automated teller machine (ATM) device, comprising:
    an instrument dispenser;
    one or more memories; and
    one or more processors, communicatively coupled to the one or more memories, configured to:
        receive information associated with a target area of the ATM device by capturing images of the target area, the target area being associated with potentially fraudulent activity targeting the ATM device;
        perform image segmentation of one or more images of the target area to detect one or more conditions, wherein the one or more conditions include at least one of:
            a hand being located proximate to a portion of an enclosure of the ATM device for longer than a threshold period of time, or
            a hand moving proximate to a portion of the enclosure of the ATM device in a particular manner indicative of fraudulent activity, and
        wherein the image segmentation is performed using a deep learning network trained using synthetic models of hands,
            the deep learning network being trained by analyzing sequences of images in which fraudulent activity occurs, and the deep learning network being trained to determine specific hand motions indicative of fraudulent activity associated with a portion of the enclosure of the ATM device;
detect, based on performing the image segmentation, the one or more conditions;
generate, based on detecting the one or more conditions, a fraud score associated with the one or more conditions,
the one or more conditions including:
a first condition, and
a second condition,
the second condition being weighted differently than the first condition when the fraud score is generated;
determine whether the fraud score meets a threshold; and
perform one or more actions based on whether the fraud score meets the threshold.

2. The ATM device of claim 1, wherein the one or more processors, when performing the one or more actions, are configured to:
store a log regarding an ATM transaction associated with the potentially fraudulent activity.

3. The ATM device of claim 1, wherein the one or more processors, when performing the one or more actions, are configured to:
cause the ATM device to intake a portion of a plurality of instruments from the instrument dispenser; and
divert the portion of the plurality of instruments to a storage area separate from an area in which other instruments are stored.

4. The ATM device of claim 3, wherein the one or more processors are further configured to:
store information that identifies an association between transaction information, associated with an ATM transaction associated with the potentially fraudulent activity, and the storage area.

5. The ATM device of claim 1, wherein the one or more processors are further configured to:
cause one or more image sensors, associated with the ATM device, to capture the images of the target area.

6. The ATM device of claim 5, wherein the one or more processors, when causing the one or more image sensors to capture the images, are configured to:
cause the one or more image sensors to capture the images before dispensing a plurality of instruments.

7. The ATM device of claim 1, wherein the one or more processors, when performing the one or more actions, are configured to:
cause a door used to access a location where the ATM device is located to be temporarily locked.

8. A method, comprising:
monitoring, by an ATM device, a target area of the ATM device by capturing images of the target area using one or more image sensors,
the target area being associated with potentially fraudulent activity targeting the ATM device;
performing, by the ATM device, image segmentation of one or more of the images using a deep learning network that is trained to perform the image segmentation using images of synthetic hand models,
the image segmentation being performed to detect one or more conditions, the one or more conditions include at least one of:
a hand being located proximate to a portion of an enclosure of the ATM device for longer than a threshold period of time, or
a hand moving proximate to a portion of the enclosure of the ATM device in a particular manner indicative of fraudulent activity,
the deep learning network being trained by analyzing sequences of images in which fraudulent activity occurs, and
the deep learning network being trained to determine specific hand motions indicative of fraudulent activity associated with a portion of the enclosure of the ATM device;
detecting, by the ATM device, the one or more conditions;
generating, by the ATM device and based on detecting the one or more conditions, a fraud score associated with the one or more conditions,
the one or more conditions including:
a first condition, and
a second condition,
the second condition being weighted differently than the first condition when the fraud score is generated;
determining, by the ATM device, whether the fraud score meets a threshold; and
performing, by the ATM device, one or more actions based on whether the fraud score meets the threshold.

9. The method of claim 8, wherein the target area includes a portion of an access panel of an enclosure of the ATM device.

10. The method of claim 8, wherein the target area includes a portion of an enclosure, of the ATM device, proximate to an internal computing device of the ATM device.

11. The method of claim 8, wherein performing the one or more actions comprises:
generating an audible alert and/or a visual alert.

12. The method of claim 8, wherein performing the one or more actions comprises:
instructing the one or more image sensors to capture additional images of the target area and/or of a vicinity of the ATM device.

13. The method of claim 8, wherein performing the one or more actions comprises:
deactivating the ATM device.

14. The method of claim 8, wherein performing the one or more actions comprises:
issuing a notification, that identifies the potentially fraudulent activity at the ATM device, to a local law enforcement authority and/or to an entity associated with the ATM device.

15. The method of claim 8, wherein performing the one or more actions comprises:
causing a door used to access a location where the ATM device is located to be temporarily locked.

16. A non-transitory computer-readable medium storing instructions, the instructions comprising:
one or more instructions that, when executed by one or more processors of an automated teller machine (ATM) device, cause the one or more processors to:
receive information associated with a target area of the ATM device by capturing images of the target area,
the target area being associated with potentially fraudulent activity targeting the ATM device;
perform image segmentation of one or more images of the target area to detect one or more conditions, wherein the one or more conditions include at least one of:
a hand being located proximate to a portion of an enclosure of the ATM device for longer than a threshold period of time, or
a hand moving proximate to a portion of the enclosure of the ATM device in a particular manner indicative of fraudulent activity, and
wherein the image segmentation is performed using a deep learning network trained using synthetic models of hands,
the deep learning network being trained by analyzing sequences of images in which fraudulent activity occurs, and
the deep learning network being trained to determine specific hand motions indicative of fraudulent activity associated with a portion of the enclosure of the ATM device;
detect the one or more conditions;
generate, based on detecting the one or more conditions, a fraud score associated with the one or more conditions,
the one or more conditions including:
a first condition, and
a second condition,
the second condition being weighted differently than the first condition when the fraud score is generated; and
perform one or more actions based on whether the fraud score meets a threshold.

17. The non-transitory computer-readable medium of claim 16, wherein the one or more instructions, when executed by the one or more processors, further cause the one or more processors to:
cause one or more image sensors, associated with the ATM device, to capture the images of the target area; and
wherein the one or more instructions, that cause the one or more processors to cause the one or more image sensors to capture the images, cause the one or more processors to:
cause the one or more image sensors to capture the images after dispensing a plurality of instruments.

18. The non-transitory computer-readable medium of claim 16, wherein the one or more instructions, when executed by the one or more processors, further cause the one or more processors to:
cause one or more image sensors, associated with the ATM device, to capture the images of the target area; and
wherein the one or more instructions, that cause the one or more processors to cause the one or more image sensors to capture the images, cause the one or more processors to:
cause the one or more image sensors to capture the images upon or after receiving an ATM transaction request.

19. The non-transitory computer-readable medium of claim 16, wherein the one or more instructions, when executed by the one or more processors, further cause the one or more processors to:
cause one or more image sensors, associated with the ATM device, to capture the images of the target area.

20. The non-transitory computer-readable medium of claim 16, wherein the one or more instructions, that cause the one or more processors to perform the one or more actions, cause the one or more processors to:
generate an audible alert and/or a visual alert.

* * * * *